(12) United States Patent
Sasaki et al.

(10) Patent No.: US 6,244,825 B1
(45) Date of Patent: Jun. 12, 2001

(54) PUMP-PROTECTING DEVICE, PUMP-PROTECTING METHOD AND PUMPING APPARATUS

(75) Inventors: Tatsuya Sasaki; Naoki Yuzuhara, both of Moriyama; Akihiko Imai, Ohmihachiman, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,354

(22) Filed: Sep. 29, 1999

(30) Foreign Application Priority Data

Oct. 1, 1998 (JP) .................................... 10-279511

(51) Int. Cl.[7] .................................... F04B 49/06
(52) U.S. Cl. .......................... 417/44.11; 417/45
(58) Field of Search ................... 417/44.11, 45, 417/32; 361/25

(56) References Cited

U.S. PATENT DOCUMENTS

| | | | |
|---|---|---|---|
| 4,242,625 | * 12/1980 | Hedges | 318/729 |
| 4,511,312 | * 4/1985 | Hartwig | 417/45 |
| 4,820,317 | * 4/1989 | Fahey | 55/21 |
| 4,864,287 | * 9/1989 | Kierstead | 417/63 |
| 5,209,110 | * 5/1993 | Sano et al. | 73/118.1 |
| 5,226,800 | * 7/1993 | Morino | 417/218 |
| 5,582,017 | * 12/1996 | Noji et al. | 417/901 |
| 5,646,499 | * 7/1997 | Doyama et al. | 318/801 |

* cited by examiner

Primary Examiner—Timothy S. Thorpe
Assistant Examiner—Michael K. Gray
(74) Attorney, Agent, or Firm—Jay H. Anderson

(57) ABSTRACT

An apparatus and a method are provided for protecting a vacuum pump from being overloaded while maintaining the vacuum condition. A pump-protecting device comprises a power detector for detecting power consumption of a motor for driving a vacuum pump as a load received by the motor, and a control means for decreasing the speed of revolution of the motor when the value of power consumption detected by the power detector is equal to or greater than a predetermined value.

45 Claims, 12 Drawing Sheets

PUMP-PROTECTING DEVICE, PUMP-PROTECTING METHOD AND PUMPING APPARATUS

FIELD OF THE INVENTION

The present invention relates to a pump-protecting device, a pump-protecting method and a pumping apparatus having such a device.

BACKGROUND OF THE INVENTION

Conventionally, a vacuum pumping apparatus making use of a vacuum pump has been used to evacuate a predetermined container. The conventionally used vacuum pumping apparatus 1 disclosed in Japanese Laid-Open Patent Publication No. 8-42487 is shown in FIG. 12. The vacuum pumping apparatus 1 comprises a vacuum pump (pump) 4 for evacuating a vacuum container 2 by discharging the air through a valve 3, a motor 5 for driving the vacuum pump 4, an inverter 7 for adjusting power transmission from a power source 6 to the motor 5, and a controller 8 for controlling the inverter 7. The above-described apparatus 1 is equipped with a mode for operating the pump at a low speed of revolution, in order to prevent condensed or sublimated gas from adhering onto the inner wall of the pump.

However, if the motor 5 becomes overloaded for some reason, the above-described pumping apparatus 1 does not take any effective countermeasure. Therefore, if the motor 5 becomes overloaded, rotary drive of the motor 5 has to be discontinued to protect the motor 5. In consequence, the above-described pumping apparatus 1 can not keep the vacuum condition any longer. Accordingly, products being processed in the vacuum container become defective, contributing to various problems including increased costs.

SUMMARY OF THE INVENTION

The object of the present invention is to provide an apparatus and a method for protecting a vacuum pump while maintaining the vacuum condition even when the motor becomes overloaded.

A characteristic of the pump-protecting device, the pump-protecting method and the pumping apparatus according to the present invention is to protect the vacuum pump from being overloaded or to decrease power consumption by changing a driving amount of a drive means in accordance with a load value received by the drive means of the vacuum pump. Specifically, a characteristic of the pump-protecting device, the pump-protecting method and the pumping apparatus according to the present invention is to detect power consumption of the drive means or necessary torque by using the load detector, and to decrease, to increase, or to variously change the driving amount of the drive means when the load or the rising rate of the load is equal to or greater than a predetermined value. It should be understood that the term, "driving amount", described in this specification means the speed of revolution, the driving speed, and the rate of acceleration. For example, if a motor is used as a drive means and a load or a rising rate of a load is equal to or greater than the predetermined value respectively, the speed of revolution of the motor is increased, decreased or variously changed.

An essential part of the pump-protecting device and the pump-protecting method of the present invention is to protect the pump and motor from being overloaded while maintaining the vacuum condition by decreasing the speed of revolution of the motor to the predetermined lowest speed by the use of the controller and by maintaining the motor operation at almost the same speed as the predetermined lowest speed when a motor is used as a drive means and if the load value detected by a load-detecting means is equal to or greater than the predetermined value.

Another essential part of the present invention is to maintain the vacuum condition by detecting the overloaded condition of the motor, decreasing the load by decreasing the speed of revolution of the motor again by recognizing that the overloaded condition is transitory by the control means after the load is left under the predetermined period o time.

DETAILED DESCRIPTION OF THE PREFERRED EMBODIMENT

Referring now to the accompanying drawings, embodiments of the pump-protecting device, pump-protecting method and pumping apparatus according to the present invention are described below.

Figure 1:
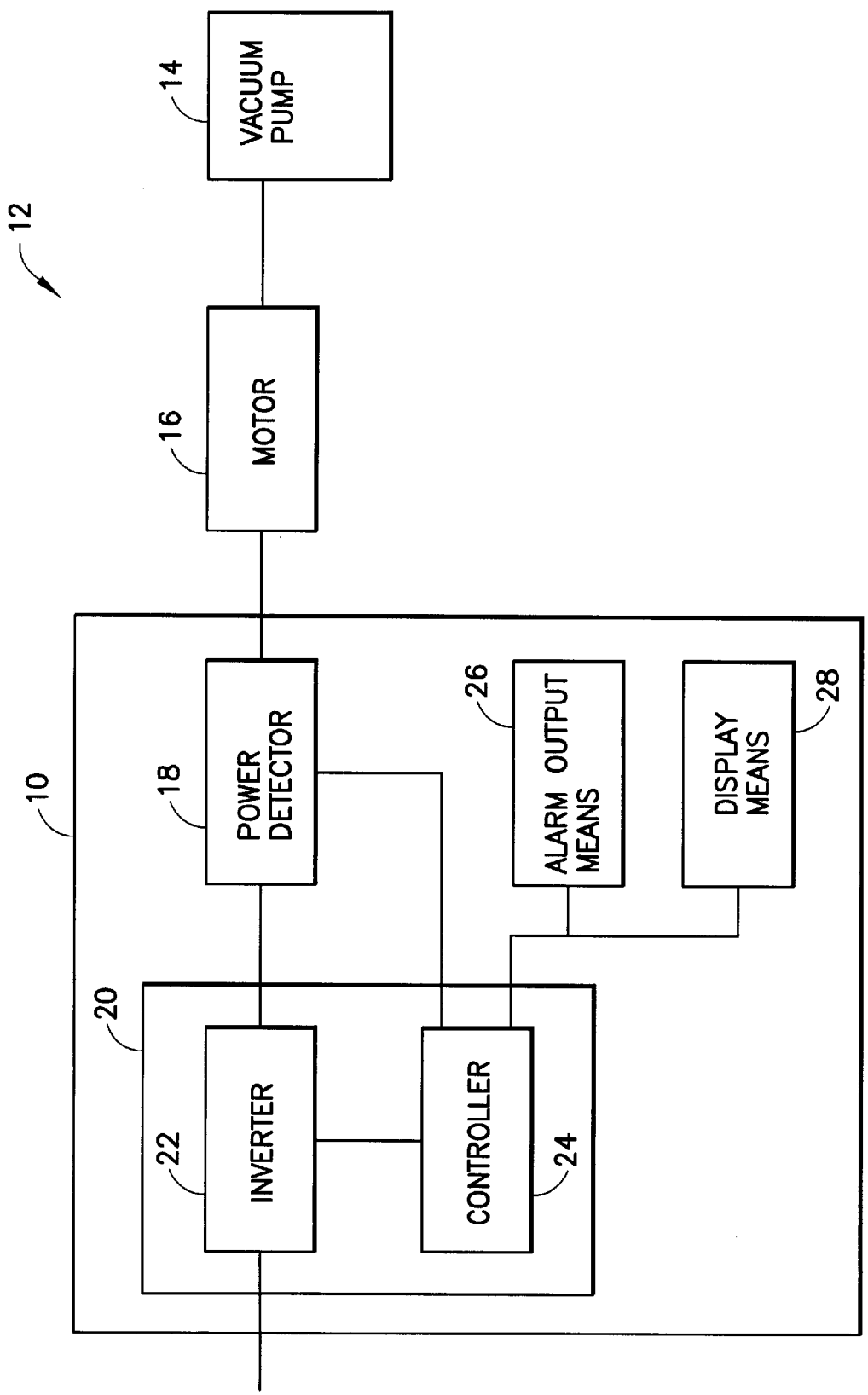
FIG. 1 is a view showing a structure of the pump-protecting device and the pumping apparatus of the present invention.
Figure 2:
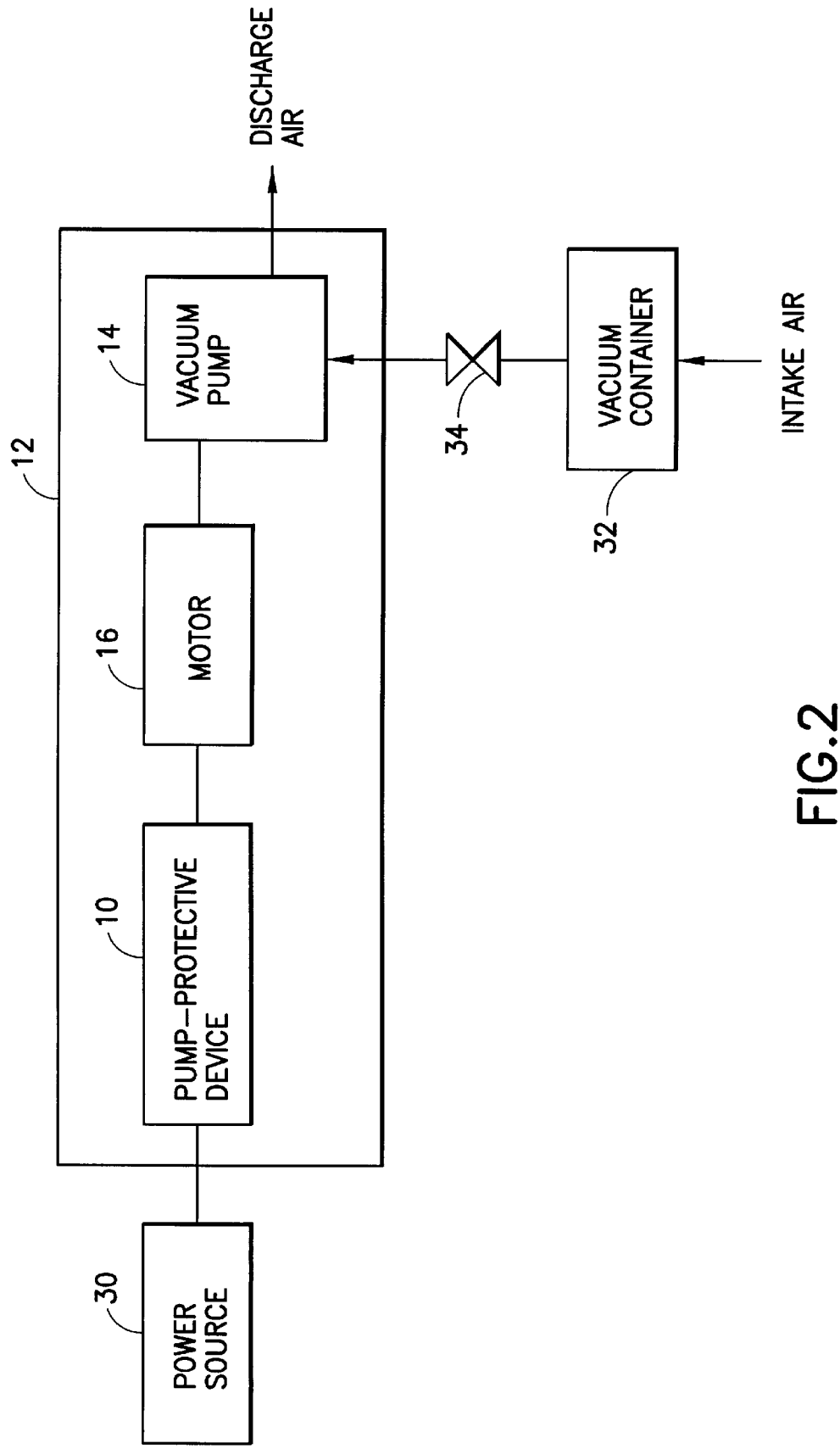
FIG. 2 is a view showing an embodiment of the pump-protecting device and the pumping apparatus shown in FIG. 1.

In FIG. 1 or 2, numeral 10 indicates a pump-protecting device of the present invention and numeral 12 indicates a pumping apparatus making use of the pump-protecting device 10 according to the present invention.

The pump-protecting device 10 comprises a power-detector 18 (load-detecting means) for detecting power consumption of the motor 16 for driving a vacuum pump 14 as a load received by the motor 16, and a control means 20 for decreasing the speed of revolution of the motor 16 when a value of power consumption detected by the power detector 18 is equal to or greater than a predetermined value.

The power detector 18 comprises a circuit for detecting power consumed by the rotation of the motor 16 and electrically transmitting the power consumption to the controller 24.

The control means 20 comprises an inverter 22 for varying the power to be fed to the motor 16 and a controller 24 for transmitting an instruction for the speed of revolution to the inverter 22 by recognizing the value of power consumption detected by the power-detector 18. In the control means 20, the controller 24 recognizes the value of power consumption and transmits an instruction to the inverter 22 to decrease the speed of revolution when power consumption is equal to or greater than the predetermined value, and the inverter 22 adjusts power transmission to the motor 16 in accordance with the instruction.

Figure 3:
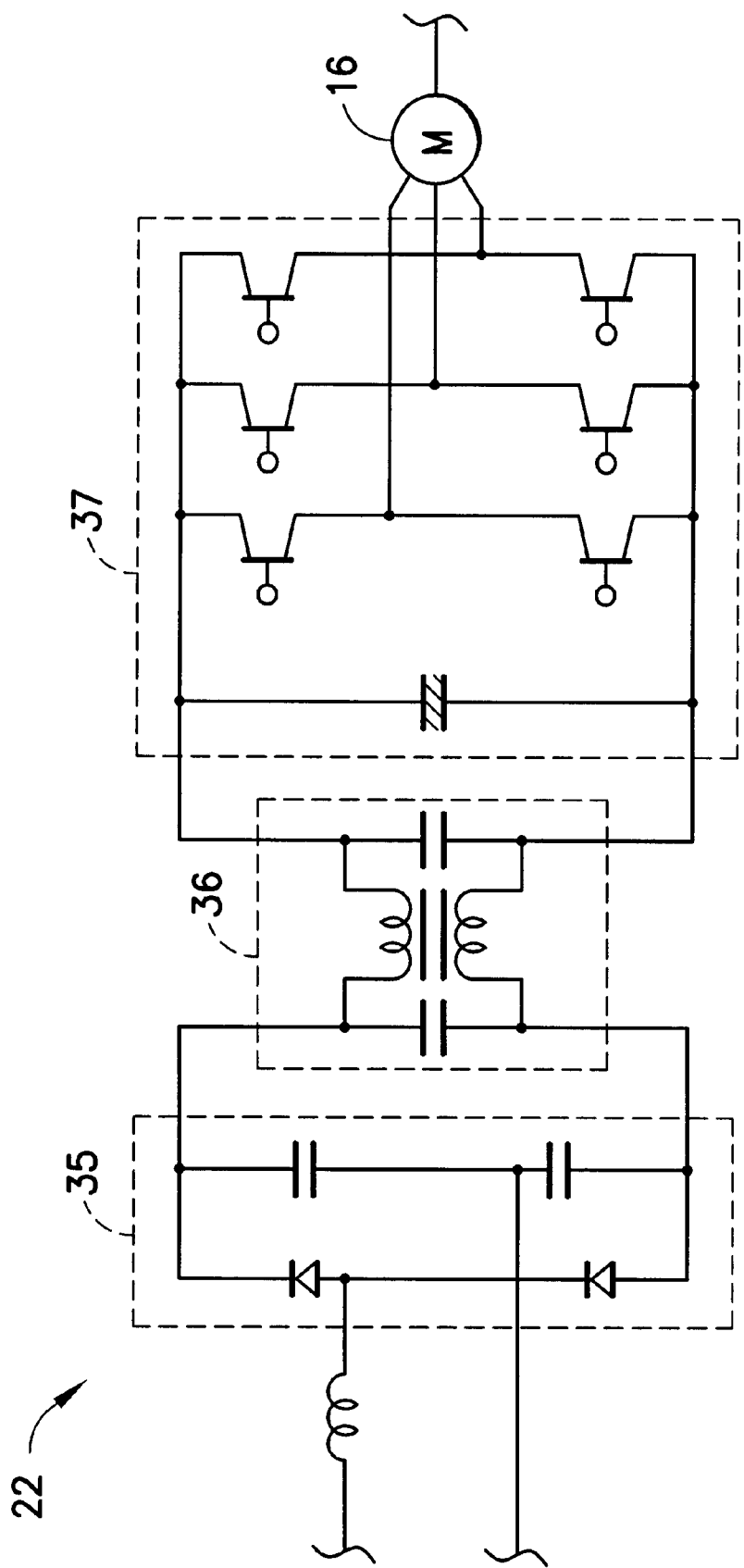
FIG. 3 is a circuit diagram of the inverter for the pump-protecting device and the pumping apparatus shown in FIG. 1.

As shown in FIG. 3, the inverter 22 comprises a rectifying circuit 35 for rectifying AC current, a smoothing circuit 36 for smoothing the rectified electrical signal and converting said signal into DC current, and an inverter circuit 37 for converting DC current into AC current. The inverter 22 varies frequency by a switching operation performed by a semiconductor element, thus varying the speed of revolution of the motor 16.

The controller 24 decreases power consumption by decreasing the speed of revolution of the motor 16 when it recognizes that the value of power consumption is equal to or greater than the predetermined value, and then it increases the speed of revolution of the motor 16 again after decreasing wattage of power consumption for a predetermined time period. The predetermined time period can be set by the controller 24.

An alarm output means 26 is connected to the controller 24 and it gives an alarm when power consumption is not decreased within a predetermined period of time even after the speed of revolution of the motor 16 is decreased by the control means 20. The predetermined period of time can be set by the controller 24. The alarm-output means 26 also gives an alarm when the value of power consumption detected by the power detector 18 is equal to or greater than the predetermined value (predetermined load value) more than a predetermined number of times. The predetermined value of power consumption is preset by the controller 24.

In addition, a display means 28 is also connected to the controller 24, which displays the power consumption value detected by the power-detector 18 and the speed of revolution of the motor 16. Thus, the display means 28 enables an operator to check the value of power consumption and the speed of revolution of the motor 16.

As shown in FIG. 2, the pumping apparatus 12 making use of the pump-protecting device 10 comprises a motor 16 driven by power transmitted from a power source 30, a vacuum pump 14 operated by the motor 16, and the pump-protecting device 10 which protects the motor 16 from being overloaded by controlling the speed of revolution of the motor 16.

A pumping operation to evacuate a vacuum container 32 by using the pumping apparatus 12 making use of the pump-protecting device 10 is described below. The method of protecting a pump according to the present invention is also described below in relation to the pumping operation.

By turning ON the switch of the power source 30 to drive the motor 16, a blade of the vacuum pump 14 rotates to discharge the air from the vacuum container 32 through a valve 34 and the vacuum pump 14. By discharging the air from the vacuum container 32, the vacuum container 32 is completely evacuated. Then the motor 16 is continuously driven to keep the vacuum container 32 in the vacuum condition.

Figure 4:
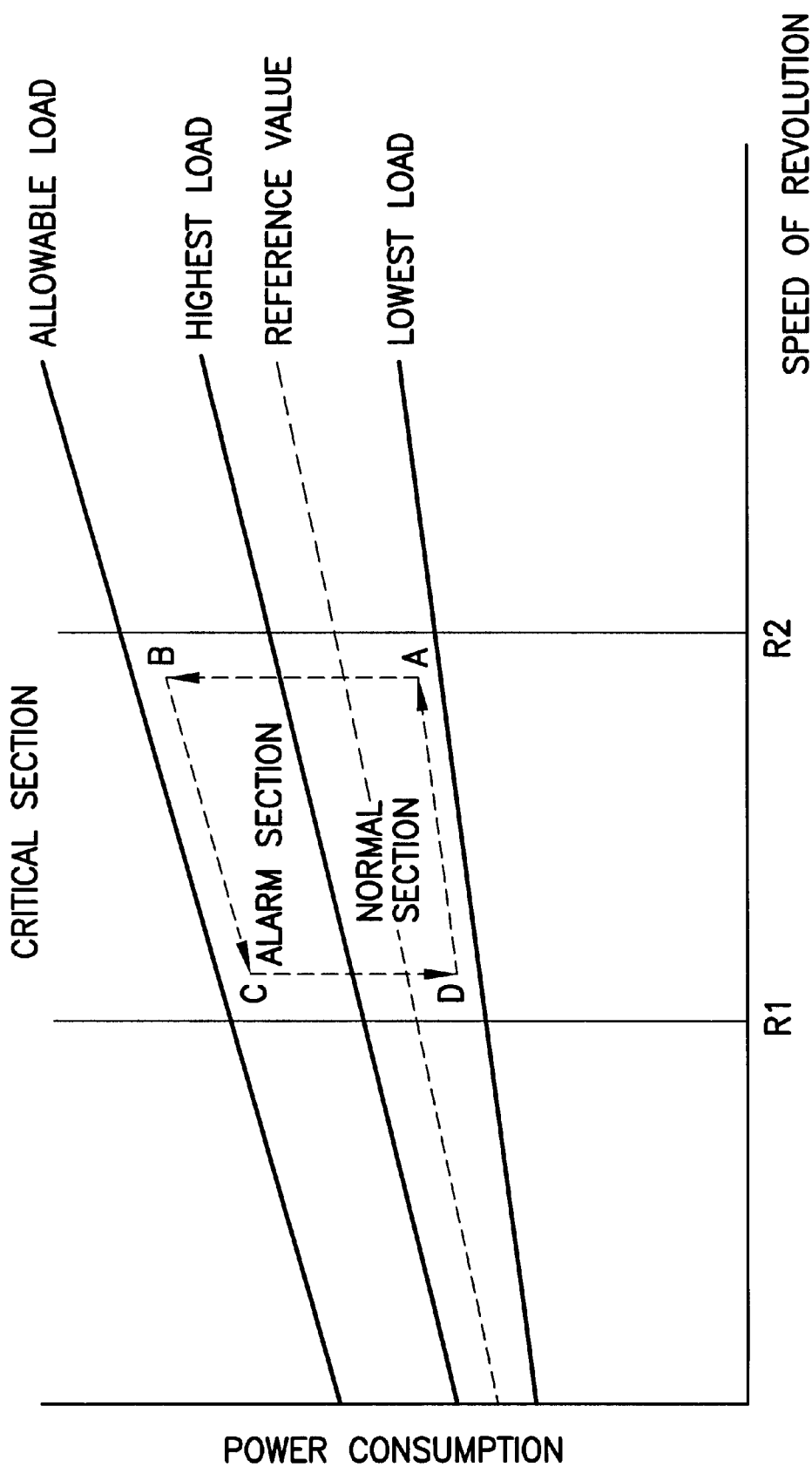
FIG. 4 is a graph illustrating the effects of the pump-protecting device, the pump-protecting method and the pumping apparatus shown in FIG. 1.

Usually, when the motor 16 is rotatively driven and the vacuum container 32 is kept in the vacuum condition, the motor 16 is driven at the speed of revolution and wattage of power consumption as shown by point A in FIG. 4. The power consumption is detected by the power-detector 18 and then transmitted to the controller 24. The controller 24 recognizes the fluctuation of wattage of power consumption.

When the vacuum pump becomes overloaded for some reason, the wattage of power consumption is equal to or greater than a predetermined value even if the motor 16 is driven at a constant speed of revolution. Accordingly, as shown in FIG. 4, the speed of revolution and wattage of power consumption is shifted from point A in the normal zone to point B in the warning zone. The predetermined value of power consumption is preset by the controller 24. When the controller 24 recognizes that the value of power consumption is shifted to point B, it transmits an instruction to the inverter 22 to decrease the speed of revolution. The inverter 22 then transmits power to the motor 16 in accordance with the instruction.

When the instruction is transmitted to the motor 16, the motor 16 decreases the speed of revolution, whereby the value of the speed of revolution is shifted to point C as shown in FIG. 4. The speed of revolution of the motor 16 is maintained in the state of point C, whereby the motor 16 is driven at almost the same speed as the lowest speed of revolution R1, so that vacuum container 32 is kept in the vacuum condition.

There may be a case where the wattage of power consumption of the motor #16 is decreased to point D as shown in FIG. 4 by decreasing the speed of revolution in accordance with the instruction from the controller 24. In this case, under the condition that the wattage of power consumption is maintained in the state of point D for a predetermined period of time, the controller 24 recognizes that the vacuum pump is in a transitory overloaded condition, and transmits an instruction to the inverter 22 to increase the speed of revolution of the motor 16. When the inverter 22 transmits a certain amount of power to the motor 16 in accordance with the above instruction, the speed of revolution is returned to the state of point A. In FIG. 4, point A indicates that the motor 16 is in normal operation, and thus, the speed of revolution of the motor 16 is maintained in the state of point A shown in FIG. 4.

On the other hand, there may be a case where the wattage of power consumption of the motor 16 is not decreased from point C to point D even when the speed of revolution of the motor 16 is decreased in accordance with the instruction from the controller 24. In this case, under the condition that the wattage of power consumption is maintained in the state of point C for a predetermined period of time, the controller 24 recognizes that the vacuum pump is in a lasting overloaded condition, and the alarm output means 26 gives an alarm to warn an operator of the overloaded condition. The above-mentioned predetermined period of time is preset by the controller 24.

There may be also a case where the transitory overloaded condition is repeated several times, even when the controller recognizes that the motor is in the transitory overloaded condition. In this case, under the condition that such a transitory overloaded condition is repeated for predetermined number of times, the alarm output means 26 gives an alarm to warn the operator of the overloaded condition. The above-mentioned predetermined number of times is preset by the controller 24.

In the pump-protecting device 10 and the pump-protecting method, and the pumping apparatus 12 of the present invention, the wattage of power consumption of the motor 16 can be detected by the power detector 18 as a load of the motor. Therefore, when the wattage of power consumption is equal to or greater than the predetermined value, the motor 16 and the vacuum pump 14 can be protected from being overloaded by decreasing the speed of revolution of the motor 16.

In addition, in the pump-protecting device 10 and the pumping apparatus 12 of the present invention, the motor 16 can be driven at almost the same speed as the lowest speed of revolution R1 by decreasing the speed of revolution, when the wattage of power consumption is equal to or greater than the predetermined value. Accordingly, it is possible to keep the vacuum container 32 in the vacuum condition continuously.

Further, in the pump-protecting device 10 and the pumping apparatus 12, when the wattage of power consumption of motor 16 is decreased to point D in accordance with the instruction from the controller and the motor is driven at the wattage of point D for a predetermined period of time, the controller recognizes that the motor is in the transitory overloaded condition and the value of power consumption is returned to the state of point A shown in FIG. 4. Thus, when the controller 24 recognizes that the motor is in the transitory overloaded condition, the motor is driven normally again, resulting in an improvement in the operating efficiency of the vacuum pump 14.

Further, in the pump-protecting device 10 and the pumping apparatus 12 related to the present invention, when the wattage of power consumption is kept at point C for a predetermined period of time even after the speed of revolution of the motor 16 is decreased in accordance with the instruction from the controller 24, the controller 24 recognizes that the motor is in the lasting overloaded condition and the alarm output means 26 gives an alarm. With this alarm, as the operator can identify the cause of the overloaded condition lasting for more than a predetermined period of time, normal operation of the pump-protecting device 10 and the pumping apparatus 12 can be resumed efficiently.

In addition, in the pump-protecting device 10 and the pumping device 12 related to the present invention, when the transitory overloaded condition is repeated more than a predetermined number of times, the alarm-output means 26 gives an alarm. Therefore, the operator can check the operating condition of the vacuum pump 14 or the motor 16, and thus the operating efficiency can be promoted.

While a preferred embodiment has been described, it should be understood that the embodiments of the pump-protecting device, the pump-protecting method and the pumping apparatus are not limited by the above.

Figure 5:
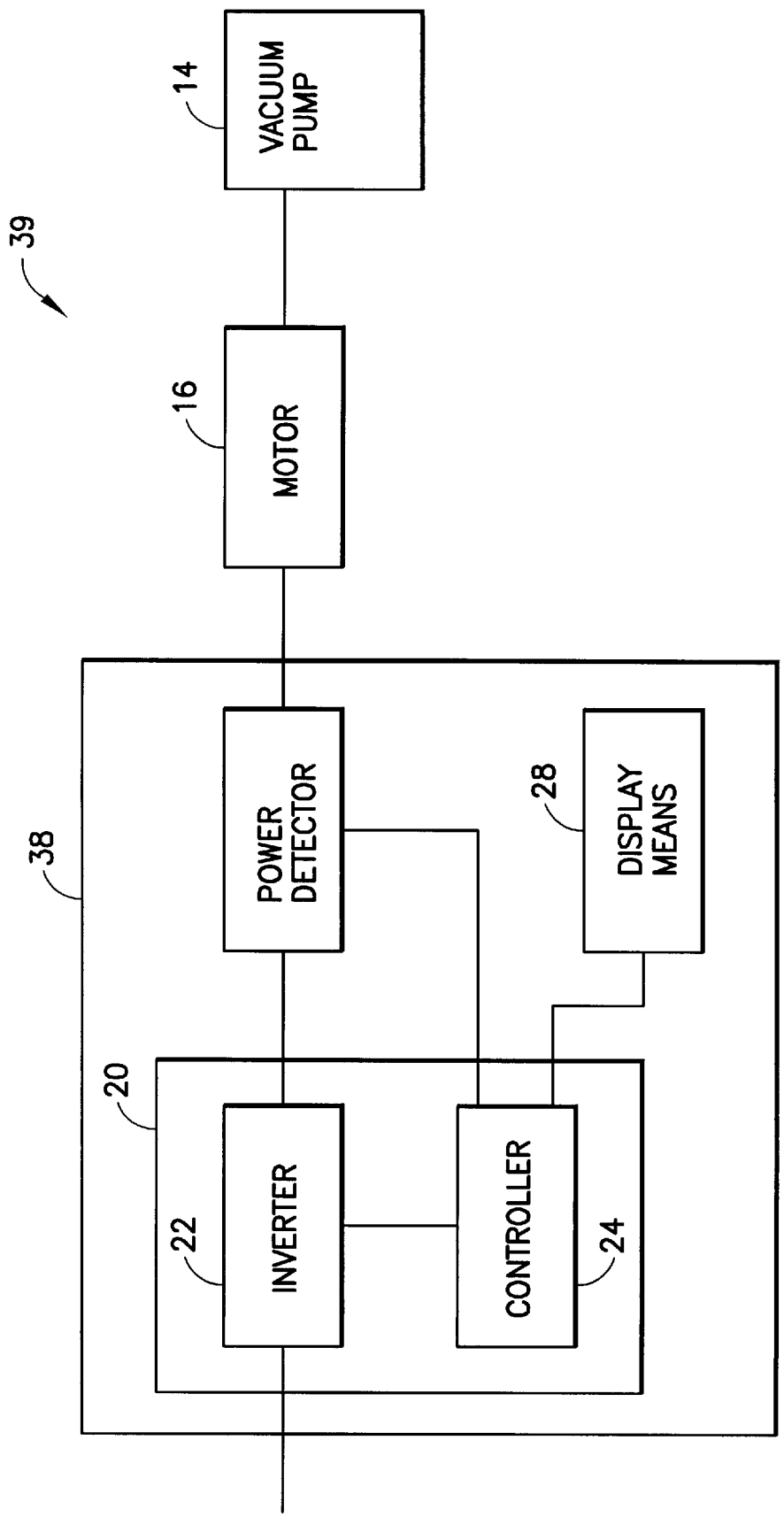
FIG. 5 is a view showing another embodiment of the pump-protecting device and the pumping apparatus of the present invention.
Figure 6:
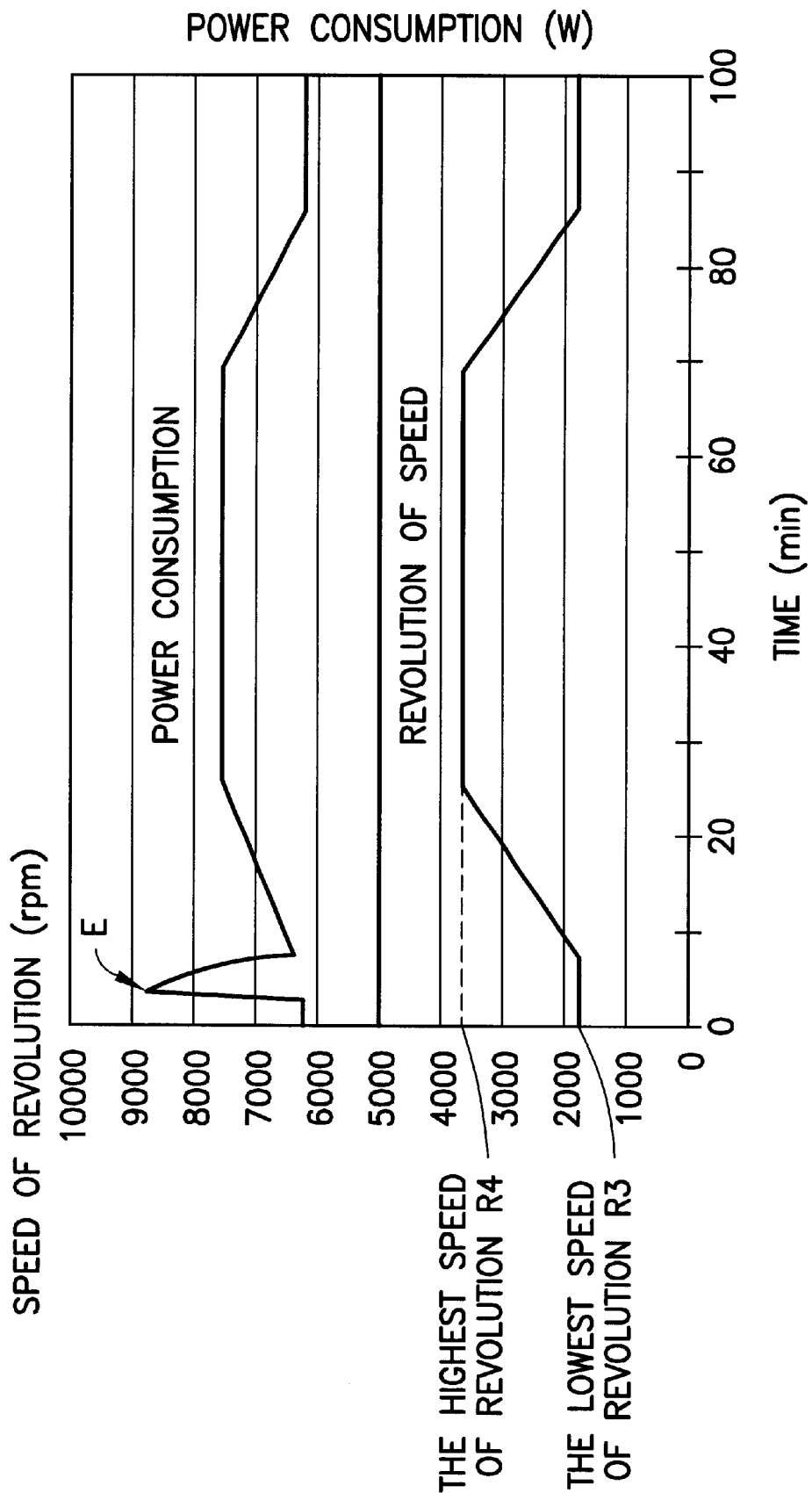
FIG. 6 is a graph illustrating the effects of the pump-protecting device, the pump-protecting method and the pumping apparatus shown in FIG. 5.

For example, the pump-protecting device and the pumping apparatus according to the present invention may be a pump-protecting device 38 and a pumping apparatus 39 shown in FIG. 5. In the pump-protecting device 38, while the motor 16 is driven at the predetermined lowest speed of revolution, the speed of revolution of the motor 16 is increased by the control means 20 and then it is decreased again to the lowest speed of revolution after a predetermined period of time when the wattage of power consumption detected by the power detecting means 18 is equal to or greater than the predetermined value. Referring to FIG. 6, these sequential operations are described below.

First, the vacuum pump 14 is operated while a valve 34 is closed, and the motor is idled at the lowest speed of revolution R3. Next, when the valve 34 is opened, air flows into the vacuum pump 14 and the wattage of power consumption is suddenly increased to point E as shown in FIG. 6. When the wattage of power consumption is suddenly increased, the speed of revolution of the motor 16 is increased to the highest speed of revolution R4 by the control means 20. After the motor is driven at the highest speed of revolution R4 for the predetermined period of time, the speed of revolution is decreased again to the lowest speed of revolution R3 and the motor is driven continuously at the lowest speed of revolution R3.

In the above-mentioned pump-protecting device 38 and the pumping apparatus 39, as the motor 16 is driven at the highest speed of revolution R4 only for the predetermined period of time after the valve 34 is opened and is normally driven at the lowest speed of revolution R3, the vacuum container 32 can be kept in the vacuum condition. Thus, the wattage of power consumption can be minimized.

Figure 7:
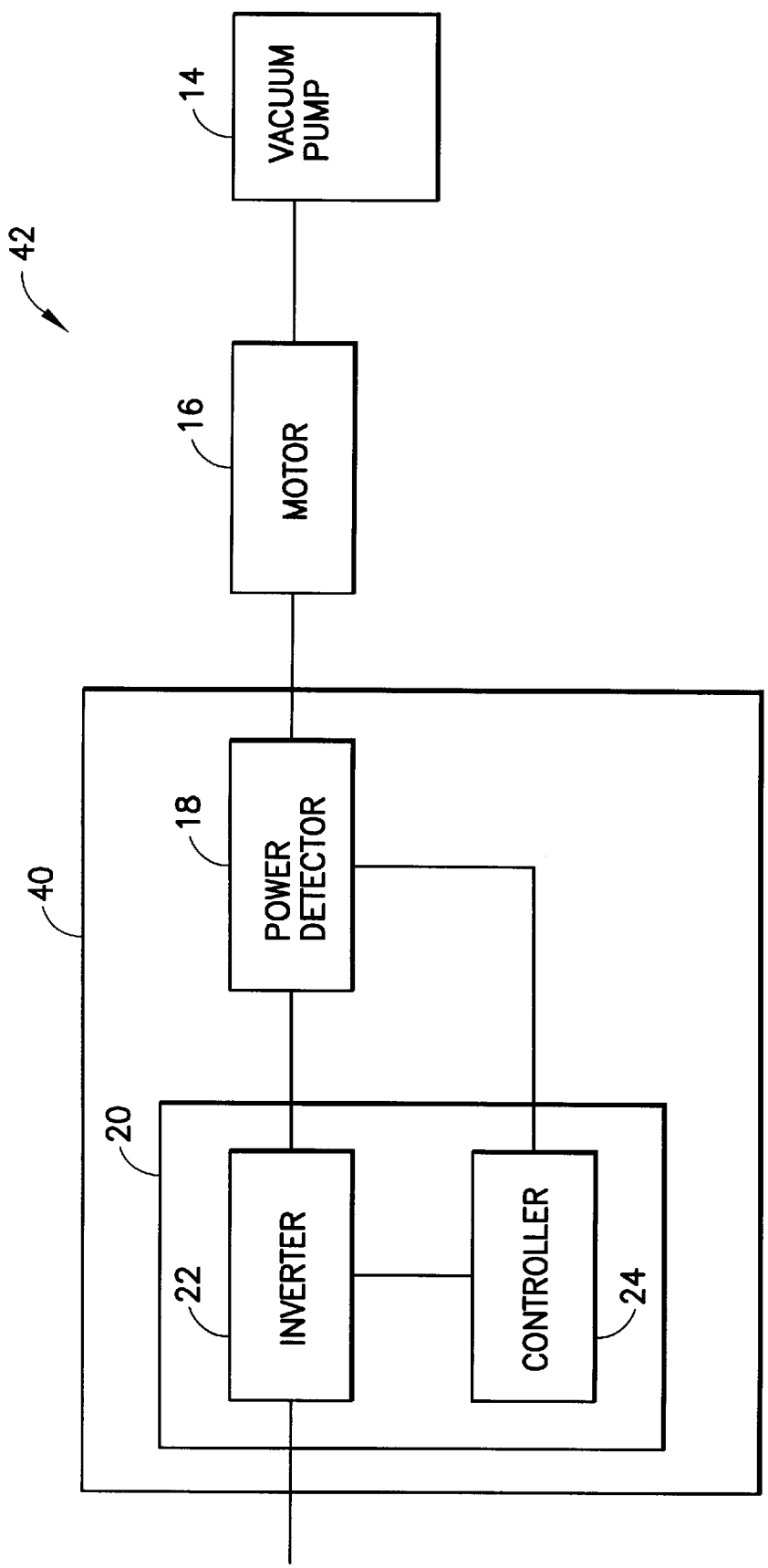
FIG. 7 is a view showing a further embodiment of the pump-protecting device and the pumping apparatus of the present invention.

The pump-protecting device and the pumping apparatus according to the present invention may be a pump-protecting device 40 and a pumping apparatus 42 shown in FIG. 7. The pump-protecting device 40 does not comprise an alarm output means 26 or a display means 28. However, even in such a pump-protecting device 40 and pumping apparatus 42, the wattage of power consumption of motor 16 can be detected by a power detector 18 and the speed of revolution of the motor 16 can be changed in accordance with the value of power consumption.

Figure 8:
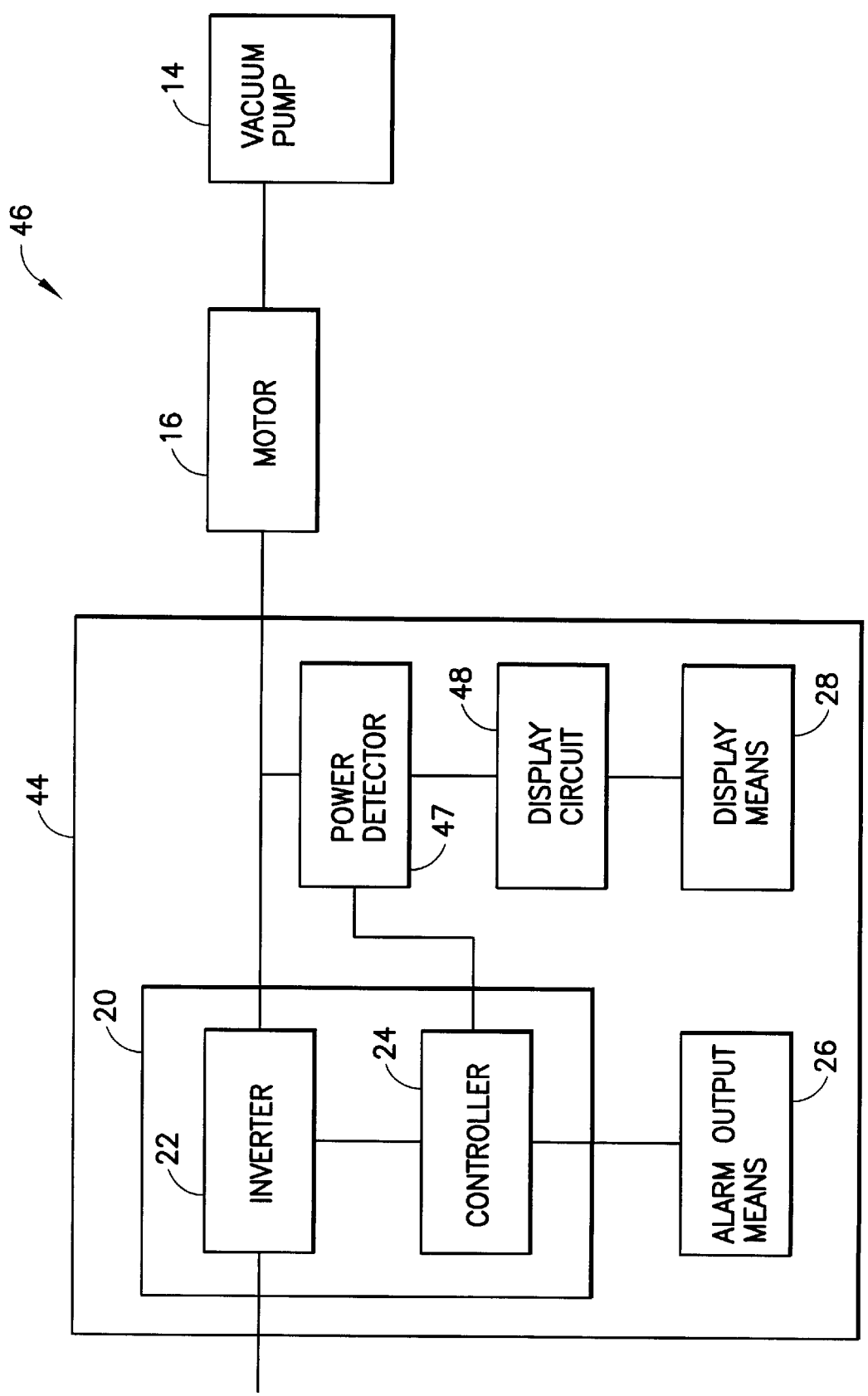
FIG. 8 is a view showing a further embodiment of the pump-protecting device and the pumping apparatus of the present invention.
Figure 9:
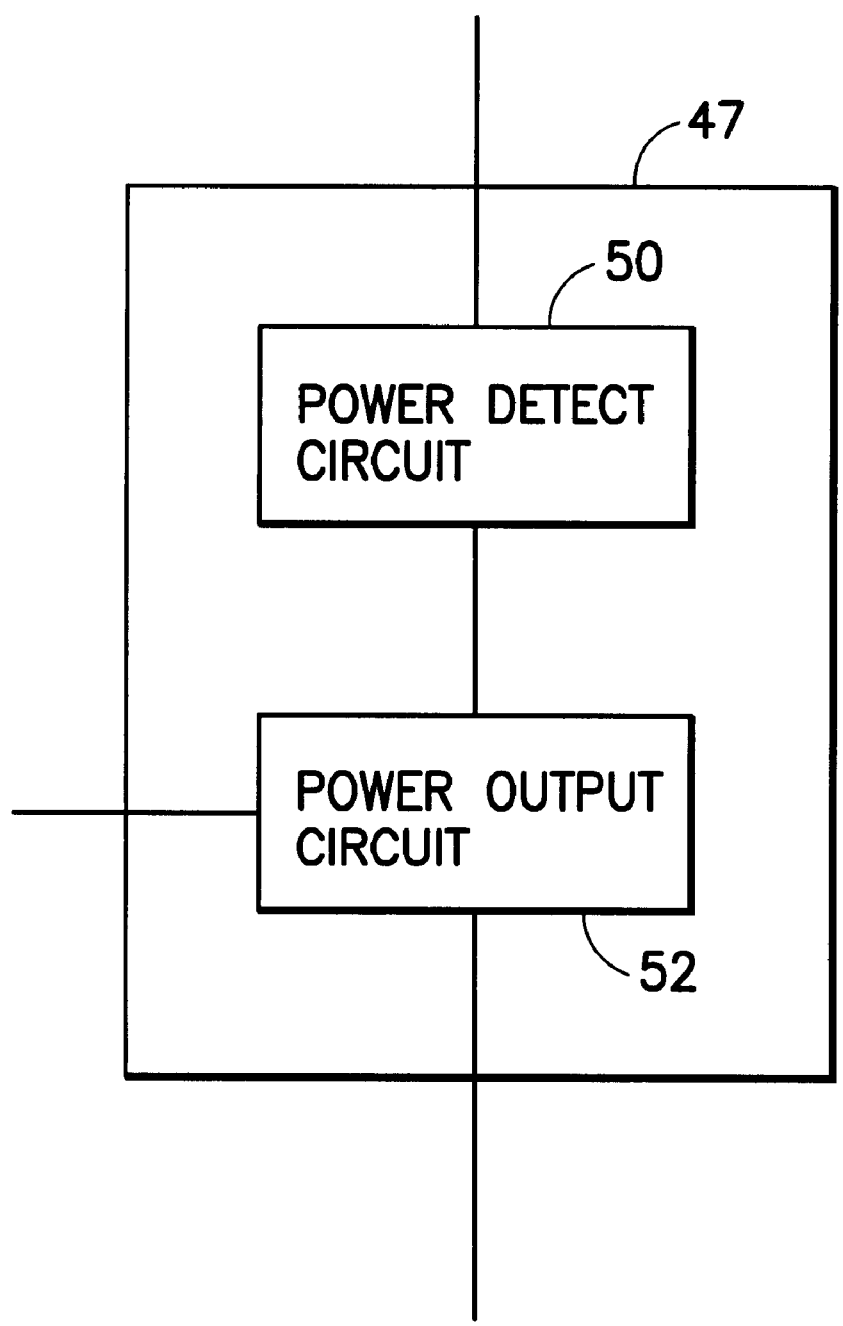
FIG. 9 is a view showing a power detector of the pump-protecting device and the pumping apparatus shown in FIG. 7.

Further, the pump-protecting device and the pumping apparatus according to the present invention may be a pump-protecting device 44 and a pumping apparatus 46 shown in FIG. 8. In the pump-protecting device 44, the wattage of power consumption detected by the power detector 47 is fed back to the controller 24 and is displayed by the display means 28 through the display circuit 48. Accordingly, as the pump-protecting device 44 comprises a display circuit for the display means 28 independently of the controller 24, wattage of power consumption can be directly shown by the display means 28. As shown in FIG. 9, the power-detector 47 comprises a power-detecting circuit 50 for recognizing the wattage of power consumption of the motor 16, power output circuit 52 for transmitting the value of power consumption to the controller 24, and the display circuit 48.

Figure 10:
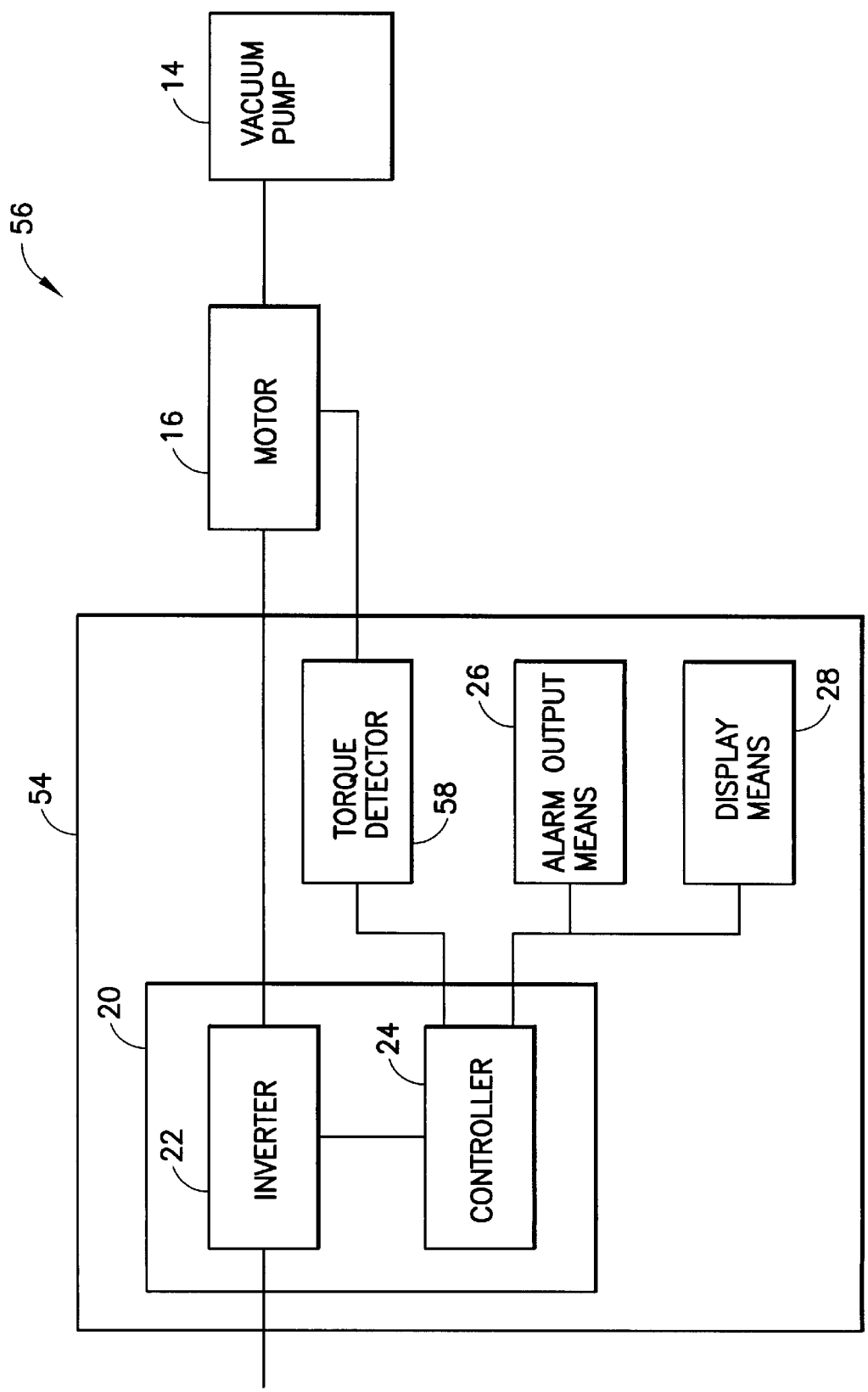
FIG. 10 is a view showing a further embodiment of the pump-protecting device and the pumping apparatus of the present invention.

Further, the pump-protecting device and the pumping apparatus according to the present invention may be a pump-protecting device 54 and a pumping apparatus 56 shown in FIG. 10. In the pump-protecting device 54, the value of torque necessary to rotate the motor 16 is detected by a torque detector 58 (load detect means) and the instruction for the speed of revolution is transmitted from the controller 24 to the inverter 22 in accordance with the value of torque. By using the torque detector 58, the load on the motor can also be detected by detecting the value of torque.

Figure 11:
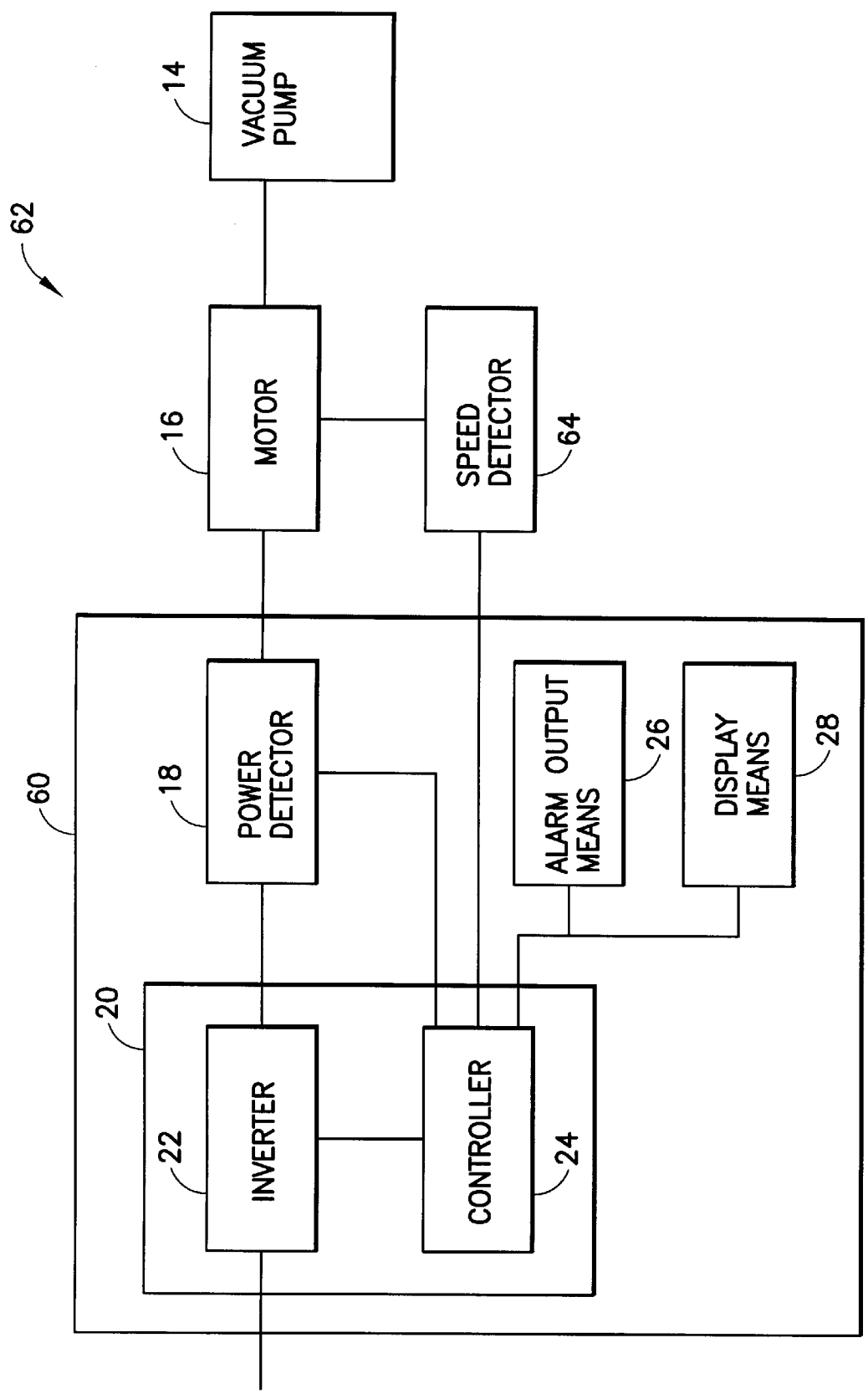
FIG. 11 is a view showing a further embodiment of the pump-protecting device and the pumping apparatus of the present invention.
Figure 12:
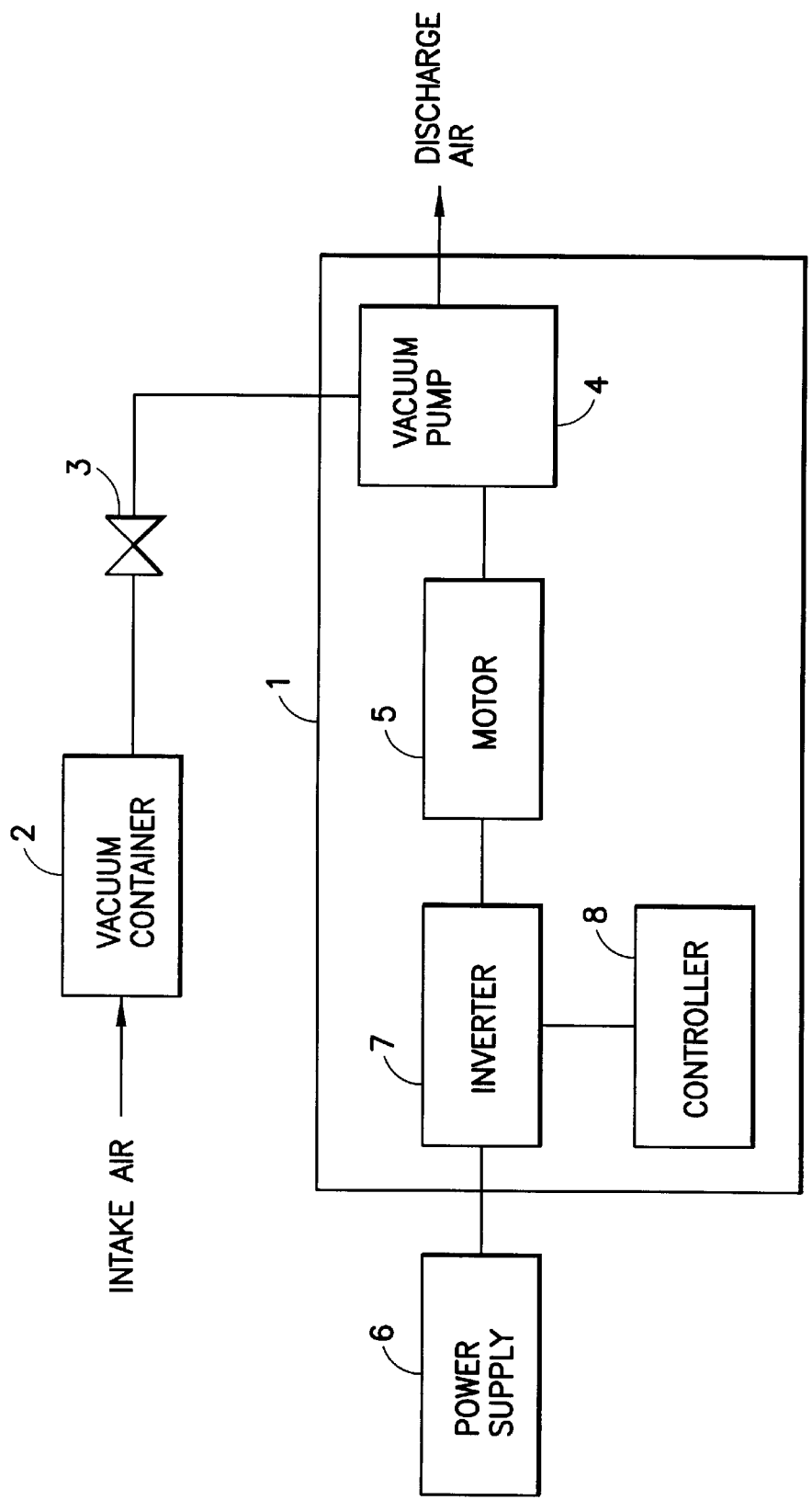
FIG. 12 is a view showing an example of a conventional pump-protecting device and pumping apparatus.

Further, the pump-protecting device and the pumping apparatus according to the invention may be a pump-protecting device 60 and a pumping apparatus 62 shown in FIG. 11. In the pumping apparatus 62, the speed of revolution of the motor 16 is detected by a speed detector 64 and is fed back to the controller 24 of the pump-protecting device 60. In the pump-protecting device 60 and the pumping apparatus 62, as the actual speed of revolution of the motor 16 can be detected, the controller 24 can recognize the difference between the actual speed of revolution of the motor 16 and the speed of revolution which is instructed from the controller 24 to the inverter 22. Therefore, the controller 24 can reduce this difference, and thus the accuracy of the instruction for the speed of revolution can be improved.

Based on the accompanying drawings, embodiments of the present invention are described; however, it should be understood that embodiments of the present invention are not limited by the above.

For example, the pump making use of the pump-protecting device, the pump making use of the pump-protecting method, or the pump of the pumping apparatus according to the present invention is not limited to the above-described vacuum pump; a pneumatic or an air-transferring pump can be used as well. In addition, a vacuum pump is not limited to a blade-rotating type of pump; a linearly-moving type of pump characterized by the reciprocating piston motion, or a fluid-circulation type of pump wherein oil is rotatively moved can also be used. Further, a pump is not limited to a pump for air, but any pump for fluid such as water and oil can also be used.

Further, the drive means of the pumping apparatus of the present invention is not limited to a motor for generating the rotary movement; an electric motor capable of generating linear movement other than rotating movement can also be used. Likewise, the motor is not limited to an AC electric motor; DC electric motor can also be used. Further, in the case of an AC electric motor, either a single-phase AC motor or a three-phase AC motor can be used. In the case of a DC electric motor, a device for changing DC power to transmit to a DC electric motor can be used as a substitute for the above-mentioned inverter.

In the device and apparatus, and the method of the present invention, a change of the speed of revolution of the motor made by the control means when the overload is detected is not limited to only an upward or downward change. However, the speed of revolution can be increased and decreased according to the circumstances. The speed of revolution of the motor can be changed by the control means when the detected load value or the rising rate of the load is equal to or greater than the predetermined value. However, it can also be changed in accordance with a preset pattern. For example, if a change pattern of a predetermined value is preset to the controller, it is possible to change the speed of revolution of the motor when the change pattern of the load detected by the load-detecting means coincides with this preset pattern.

In the device and apparatus, and the method of the present invention, the structure of the power detector is not particularly limited; a detector for measuring a voltage value by feeding a predetermined current, or measuring a current value by feeding a predetermined voltage, can be used. In addition, either an analog power-detector or a digital power-detector can be used.

In the device and apparatus, and the method of the present invention, the circuit of the inverter is not limited to the one shown in FIG. 3, but any inverter circuit capable of changing the speed of revolution of the motor can be used. It should be understood that "the inverter" described in this specification means a device comprising at least an inverter circuit. The inverter circuit is not particularly limited, however, as far as it can convert DC current into AC current by switching operation performed by a semiconductor element; any inverter circuit capable of changing frequency, amplitude of voltage or electric current, phase or the like can be used.

The circuit of the controller is not particularly limited, but a circuit capable of detecting a load of the motor by the load-detecting means and transmitting an instruction for the speed of revolution to the inverter can be used. Also, the circuit of the controller is not limited to an analog circuit, but a digital circuit can also be used. For example, it is possible to use a circuit in which the value of power consumption transmitted from the power detector is digitized by the A/D converter and then processed by the CPU based on the program stored in the memory.

According to the pump-protecting device, the pump-protecting method, and the pumping apparatus related to this invention, a pump can be protected from being overloaded by changing the driving amount of the drive means in accordance with the load value received by the drive means of the pump. For example, when the load value received by the driving means is equal to or greater than a predetermined value, the pump or the drive means can be protected from being overloaded by decreasing the driving amount of the drive means. Thus, the service life of the pump and the drive means can be extended, and the pump and the drive means can be prevented from being damaged.

Further, a characteristic of the pump-protecting device and the pump-protecting method of the present invention is to decrease the speed of revolution of the motor to the predetermined lowest speed, and then to drive the motor at almost the same speed as the lowest speed of revolution when the load value for the motor is equal to or greater than the predetermined value. If the motor becomes overloaded, the motor can be protected by decreasing the speed of revolution of the motor, and the vacuum condition can be maintained by driving the motor at almost the same speed as the lowest speed of revolution. Accordingly, the vacuum container can be kept in the vacuum condition continuously.

A further characteristic of the pump-protecting device and the pump-protecting method of the present invention is to decrease the load of the motor by detecting the overloaded condition of the motor and decreasing the speed of revolution of the motor, and then to increase the speed of revolution of the motor again after the motor is driven while the load value is below the predetermined load value. In the case of the transitory overloaded condition in which the load is decreased by decreasing the speed of revolution of the motor, the vacuum condition can be maintained by driving the motor normally again. Therefore, as the pumping apparatus does not need to be stopped, the operating efficiency can be increased.

A still further characteristic of the pump-protecting device and the pump-protecting method of the present invention is to temporarily increase the speed of revolution of the motor when the load value of the motor is equal to or greater than the predetermined value and then to decrease the speed of revolution of the motor again to the lowest speed after a predetermined period of time. Thus, the speed of revolution of the motor can be increased only when the need arises. In this manner, unnecessary power consumption can be prevented, thereby permiting cost reductions.

Having now fully described the present invention, it will be apparent to one of ordinary skill in the art that various changes, modifications and improvements can be made thereto without departing from the spirit or scope of the present invention as set forth herein and as described in the following claims.

We claim:

1. A pump-protecting device adjusting a driving amount of a drive means for driving a pump while maintaining a desired vacuum condition, the pump-protecting device comprising:

load-detecting means for detecting a load received by the drive means; and control means for adjusting the driving amount of the drive means while permitting continued operation of the pump so as to maintain the desired vacuum condition, depending on a load value detected by said load-detecting means.

2. A pump-protecting device according to claim 1, wherein said drive means comprises a motor, and a speed of revolution of said motor is changed by said control means when the load value detected by said load-detecting means is equal to or greater than a predetermined load value or when a rate of increase of said load is equal to or greater than a predetermined rate.

3. A pump-protecting device according to claim 2, wherein said load-detecting means comprises a power detector for detecting a power consumption of said motor as a load received by said motor.

4. A pump-protecting device according to claim 2 or claim 3, wherein said control means comprises:

an inverter for changing electric power transmitted to said motor; and a controller for transmitting an instruction concerning the speed of revolution to said inverter.

5. A pump-protecting device according to claim 2 or claim 3, wherein said control means decreases the speed of revolution of said motor when the load value detected by said load detecting means is equal to or greater than the predetermined load value.

6. A pump-protecting device according to claim 4, wherein said control means decreases the speed of revolution of said motor when the load value detected by said load detecting means is equal to or greater than the predetermined load value.

7. A pump-protecting device according to claim 5, wherein said control means decreases the speed of revolution of said motor, so that said motor is driven at a speed substantially the same as predetermined lowest speed of revolution.

8. A pump-protecting device according to claim 6, wherein said control means decreases the speed of revolution of said motor, so that said motor is driven at a speed substantially the same as predetermined lowest speed of revolution.

9. A pump-protecting device according to claim 5, wherein the speed of revolution of said motor is increased by said control means, after said load remains under the predetermined value for the predetermined period of time, following decreasing said load to less than the predetermined value by decreasing the speed of revolution of said motor by said control means.

10. A pump-protecting device according to claim 6, wherein the speed of revolution of said motor is increased by said control means, after said load remains under the predetermined value for the predetermined period of time, following decreasing said load to less than the predetermined value by decreasing the speed of revolution of said motor by said control means.

11. A pump-protecting device according to claim 7, wherein the speed of revolution of said motor is increased by said control means, after said load remains under the predetermined value for the predetermined period of time, following decreasing said load to less than the predetermined value by decreasing the speed of revolution of said motor by said control means.

12. A pump-protecting device according to claim 8, wherein the speed of revolution of said motor is increased by said control means, after said load remains under the predetermined value for the predetermined period of time, following decreasing said load to less than the predetermined value by decreasing the speed of revolution of said motor by said control means.

13. A pump-protecting device according to claim 5, further comprising an alarm output means which gives an alarm in a case where said load value is not decreased when the speed of revolution of said motor is decreased by said control means or in a case where said load value is equal to or greater than the predetermined load value more than a predetermined number of times.

14. A pump-protecting device according to claim 6, further comprising an alarm output means which gives an alarm in a case where said load value is not decreased when the speed of revolution of said motor is decreased by said control means or in a case where said load value is equal to or greater than the predetermined load value more than a predetermined number of times.

15. A pump-protecting device according to claim 7, further comprising an alarm output means which gives an alarm in a case where said load value is not decreased when the speed of revolution of said motor is decreased by said control means or in a case where said load value is equal to or greater than the predetermined load value more than a predetermined number of times.

16. A pump-protecting device according to claim 8, further comprising an alarm output means which gives an alarm in a case where said load value is not decreased when the speed of revolution of said motor is decreased by said control means or in a case where said load value is equal to or greater than the predetermined load value more than a predetermined number of times.

17. A pump-protecting device according to claim 9, further comprising an alarm output means which gives an alarm in a case where said load value is not decreased when the speed of revolution of said motor is decreased by said control means or in a case where said load value is equal to or greater than the predetermined load value more than a predetermined number of times.

18. A pump-protecting device according to claim 10, further comprising an alarm output means which gives an alarm in a case where said load value is not decreased when the speed of revolution of said motor is decreased by said control means or in a case where said load value is equal to or greater than the predetermined load value more than a predetermined number of times.

19. A pump-protecting device according to claim 11, further comprising an alarm output means which gives an alarm in a case where said load value is not decreased when the speed of revolution of said motor is decreased by said control means or in a case where said load value is equal to or greater than the predetermined load value more than a predetermined number of times.

20. A pump-protecting device according to claim 12, further comprising an alarm output means which gives an alarm in a case where said load value is not decreased when the speed of revolution of said motor is decreased by said control means or in a case where said load value is equal to or greater than the predetermined load value more than a predetermined number of times.

21. A pump-protecting device according to claim 2 or claim 3, wherein, in a case where the load value detected by said load-detecting means is equal to or greater than the predetermined value or the rate of increase of said load is equal to or greater than the predetermined rate after said motor is driven at a predetermined lowest speed of revolution, then the speed of revolution of said motor is increased by said control means and then decreased to the predetermined lowest speed after a predetermined period of time.

22. A pump-protecting device according to claim 4, wherein, in a case where the load value detected by said load-detecting means is equal to or greater than the predetermined value or the rate of increase of said load is equal to or greater than the predetermined rate after said motor is driven at a predetermined lowest speed of revolution, then the speed of revolution of said motor is increased by said control means and then decreased to the predetermined lowest speed after a predetermined period of time.

23. A pump-protecting method adjusting a driving amount of a drive means for driving a pump while maintaining a desired vacuum condition, comprising the steps of:
   driving a drive means of a pump with a predetermined driving amount;
   detecting a load received by said drive means; and
   adjusting the driving amount of said drive means while permitting continued operation of the pump so as to maintain the desired vacuum condition, depending on a load value detected in said detecting step.

24. A pump-protecting method according to claim 23, wherein said drive means comprises a motor, and said controlling step further comprises a step of changing a speed of revolution of said motor in a case where the load value detected in said detecting step is equal to or greater than a predetermined load value.

25. A pump-protecting method according to claim 24, wherein said detecting step further comprises a step of detecting a power consumption of said motor as a load received by said motor.

26. A pump-protecting method according to claim 24 or claim 25, wherein said controlling step further comprises a step of decreasing the speed of revolution of said motor by an inverter.

27. A pump-protecting method according to claim 24 or claim 25, wherein said controlling step further comprises a step of decreasing the speed of revolution of said motor in a case where the load value detected in said load-detecting step is equal to or greater than the predetermined load value.

28. A pump-protecting method according to claim 26, wherein said controlling step further comprises a step of decreasing the speed of revolution of said motor in a case where the load value detected in said load-detecting step is equal to or greater than the predetermined load value.

29. A pump-protecting method according to claim 27, wherein said controlling step further comprises a step of driving said motor at a speed substantially the same as a predetermined lowest speed of revolution by decreasing the speed of revolution of said motor.

30. A pump-protecting method according to claim 28, wherein said controlling step further comprises a step of driving said motor at a speed substantially the same as a predetermined lowest speed of revolution by decreasing the speed of revolution of said motor.

31. A pump-protecting method according to claim 27, wherein said controlling step further comprises a step of increasing the speed of revolution of said motor after said load is left under the predetermined load value for a predetermined period of time, following a step of decreasing said load to less than the predetermined load value by decreasing the speed of revolution of said motor.

32. A pump-protecting method according to claim 28, wherein said controlling step further comprises a step of increasing the speed of revolution of said motor after said load is left under the predetermined load value for a predetermined period of time, following a step of decreasing said load to less than the predetermined load value by decreasing the speed of revolution of said motor.

33. A pump-protecting method according to claim 29, wherein said controlling step further comprises a step of increasing the speed of revolution of said motor after said load is left under the predetermined load value for a predetermined period of time, following a step of decreasing said load to less than the predetermined load value by decreasing the speed of revolution of said motor.

34. A pump-protecting method according to claim 30, wherein said controlling step further comprises a step of increasing the speed of revolution of said motor after said load is left under the predetermined load value for a predetermined period of time, following a step of decreasing said load to less than the predetermined load value by decreasing the speed of revolution of said motor.

35. A pump-protecting method according to claim 27, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

36. A pump-protecting method according to claim 28 wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

37. A pump-protecting method according to claim 29, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

38. A pump-protecting method according to claim 30, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

39. A pump-protecting method according to claim 31, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

40. A pump-protecting method according to claim 32, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

41. A pump-protecting method according to claim 33, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

42. A pump-protecting method according to claim 34, wherein said controlling step further comprises a step of giving an alarm in a case where said load is not decreased within a predetermined period of time when the speed of revolution of said motor is decreased or in a case where said load value is equal to or greater than the predetermined load value more than a predetermined number of times.

43. A pump-protecting method according to claim 24 or claim 25, wherein said controlling step further comprises a step of increasing the speed of revolution of said motor and then decreasing the speed of revolution of said motor to the predetermined lowest speed after a predetermined period of time in a case where the load value detected by said load-detecting means is equal to or greater than the predetermined load value.

44. A pump-protecting method according to claim 26, wherein said controlling step further comprises a step of increasing the speed of revolution of said motor and then decreasing the speed of revolution of said motor to the predetermined lowest speed after a predetermined period of time in a case where the load value detected by said load-detecting means is equal to or greater than the predetermined load value.

45. A pumping apparatus comprising an electrically-driven drive means for driving a pump, a pump operated by said drive means, and a pump-protecting device for protecting said drive means from being overloaded, while permitting continued operation of the pump so as to maintain a desired vacuum condition, by controlling a driving amount of said drive means, wherein said pump-protecting device comprises a load-detecting means for detecting a load received by the drive means and a controlling means for adjusting the driving amount of said drive means depending on a load value detected by said load-detecting means.

* * * * *